US005228180A

United States Patent [19]

Bauer et al.

[11] Patent Number: 5,228,180

[45] Date of Patent: Jul. 20, 1993

[54] WITHDRAWING DEVICE FOR WITHDRAWING A ROLLER BEARING FROM AN ARBOR

[75] Inventors: Ulrich Bauer, Steinheim; Monika Schrem, Giengen, both of Fed. Rep. of Germany

[73] Assignee: Albert Schrem Werkzeugfabrik GmbH, Giengen, Fed. Rep. of Germany

[21] Appl. No.: 880,251

[22] Filed: May 8, 1992

[30] Foreign Application Priority Data

May 8, 1991 [DE] Fed. Rep. of Germany .... 4114994.7

[51] Int. Cl.$^{5}$ .............................................. B23P 19/04

[52] U.S. Cl. ........................................ 29/263; 29/258; 29/259

[58] Field of Search ................. 29/253, 256, 258, 259, 29/263, 265

[56] References Cited

U.S. PATENT DOCUMENTS

| | | | |
|---|---|---|---|
| 1,736,529 | 11/1929 | Goeller | 29/263 |
| 3,008,226 | 11/1961 | Kellerman | 29/263 |
| 4,059,883 | 11/1977 | Osborne | 29/263 X |
| 4,507,838 | 4/1985 | Hacker | 29/263 |
| 4,769,890 | 9/1988 | Maynard | 29/259 |
| 4,852,235 | 8/1989 | Trease et al. | 29/263 |

FOREIGN PATENT DOCUMENTS

| | | | |
|---|---|---|---|
| 819830 | 9/1951 | Fed. Rep. of Germany . | |
| 1269069 | 8/1962 | Fed. Rep. of Germany . | |
| 815256 | 4/1937 | France | 29/263 |
| 844419 | 4/1939 | France | 29/263 |
| 1291298 | 7/1969 | Netherlands | 29/258 |
| 286953 | 3/1953 | Switzerland . | |

*Primary Examiner*—Mark Rosenbaum

*Assistant Examiner*—S. Thomas Hughes

*Attorney, Agent, or Firm*—Robert W. Becker & Associates

[57] ABSTRACT

A withdrawing device for withdrawing a roller bearing from an arbor is comprised of a hollow body having a withdrawal sleeve and a spindle that axially penetrates the hollow body. The withdrawal sleeve has axially extending slots defining therebetween tongues with ends that widen radially outwardly in a cone shape with a conical outer mantle surface. The free ends constitute withdrawal elements. A clamping sleeve is axially slidably and rotatably connected to the hollow body. At one end thereof the clamping sleeve has a conical inner mantle surface mating with the conical outer mantle surface of the free ends. The clamping sleeve is comprised of a pressure sleeve and an adjusting sleeve, whereby the pressure sleeve comprises the conical inner mantle surface and the adjusting sleeve is rotatably connected to the hollow body and rotatably and axially fixedly connected to the pressure springs.

14 Claims, 1 Drawing Sheet

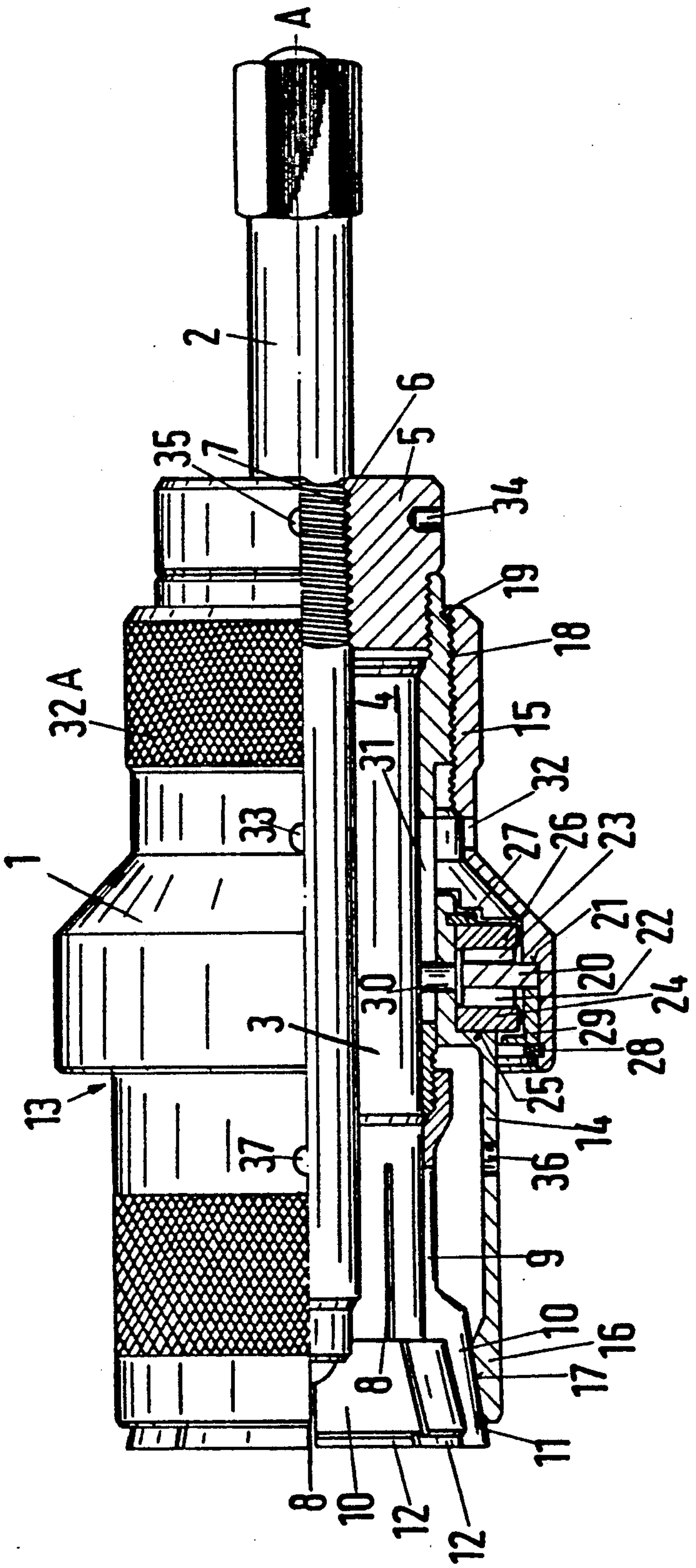
A
2
6
7
35
5
34
19
18
32 A
4
15
31
32
33
27
26
23
1
21
22
20
30
24
3
29
28
25
13
14
37
36
9
10
16
17
8
11
8
10
12
12

WITHDRAWING DEVICE FOR WITHDRAWING A ROLLER BEARING FROM AN ARBOR

BACKGROUND OF THE INVENTION

The present invention relates to a withdrawing device for withdrawing a roller bearing from an arbor, wherein the device comprises a hollow body comprising a withdrawal sleeve, a spindle axially penetrating the hollow body, whereby the withdrawal sleeve has axially extending slots defining therebetween tongues having free ends that radially outwardly widen in a cone shape with a conical outer mantle surface and the free ends constitute withdrawal elements. Furthermore, a clamping sleeve that is axially slidably and rotatably connected to the hollow body is provided whereby the clamping sleeve has at one end thereof a conical inner mantle surface mating with the conical outer mantle surface of the free ends.

A withdrawal device of this kind is known from German Auslegeschrift 1 269 069 and may be placed onto the roller bearing to be removed with the threaded spindle so that the tongues with their withdrawal elements in the form of gripping elements grip the roller body, for example, the rollers of a conical roller bearing, whereafter the clamping sleeve is axially displaced by turning it on the hollow body. Via the conical abutment surfaces the tongues are thus radially displaced so that the gripping elements grip the roller or engage behind the inner or the outer ring of the roller bearing. With an axial pulling movement, the roller bearing together with the withdrawal device may then be removed from the arbor. During the radial adjustment movement of the tongues, the cone structure of the clamping sleeve performs a gliding movement on the conical mantle surface, which is formed by the tongues, that corresponds to the rotational, respectively, sliding movement of the clamping sleeve. Accordingly, strong frictional forces act on the conical abutment surfaces so that for the rotational movement of the clamping sleeve great forces must be exerted which may only be provided by respective auxiliary tools such as a hooked or a fork wrench. Furthermore, the wear at the conical abutment surfaces is great.

It is therefore an object of the present invention to simplify the handling of a withdrawal device of the aforementioned kind.

BRIEF DESCRIPTION OF THE DRAWING

This object, and other objects and advantages of the present invention, will appear more clearly from the following specification in conjunction with the accompanying only drawing, in which an embodiment of the present invention is shown in a partially cross-sectioned side view along the axis of the device.

SUMMARY OF THE INVENTION

The withdrawing device of the present invention is primarily characterized by having a hollow body comprising a withdrawal sleeve; a spindle axially penetrating the hollow body; the withdrawal sleeve having axially extending slots defining therebetween tongues having free ends that radially outwardly widen in a cone shape with a conical outer mantle surface, the free ends constituting withdrawal elements; a clamping sleeve axially slidably and rotatably connected to the hollow body, the clamping sleeve having at one end thereof a conical inner mantle surface mating with the conical outer mantle surface of the free ends; and the clamping sleeve being comprised of a pressure sleeve and an adjusting sleeve, wherein the pressure sleeve comprises the aforementioned conical inner mantle surface and the adjusting sleeve is rotatably connected to the hollow body and rotatably and axially fixedly connected to the pressure sleeve.

The inventive two-part embodiment of the clamping sleeve allows the transmission of exclusively axial forces onto the tongues of the withdrawal sleeve since only the adjusting sleeve, which forms one part of the clamping sleeve is turned on the hollow body and is thereby rotated relative to the other part of the clamping sleeves in the form of the pressure sleeve, thereby, however, axially displacing the pressure sleeve. Accordingly, only a displacing movement in the axial direction occurs between the inner and outer conical mantle surface (abutment surfaces) so that the friction, as compared to the aforementioned prior art withdrawal devices, is considerably reduced. Therefore, considerably reduced activating forces are required. Furthermore, the wear at the conical abutment surfaces is considerably reduced. The opening and closing of the withdrawal sleeves, i.e., the radial displacement of the tongue, is possible without any auxiliary tools, especially when the pressure sleeve and the adjusting sleeve are connected to one another by followers which are supported relative to one another by bearings.

It is therefore expedient that the withdrawal device further comprises at least two followers for connecting the pressure sleeve and the adjusting sleeve to one another, and bearings for supporting the followers relative to one another.

Expediently, a first follower is axially and rotatably fixedly connected to the adjusting sleeve, and a second follower is axially and rotatably fixedly connected to the pressure sleeve. Preferably, the first follower is an annular disk that is coaxially arranged relative to the longitudinal axis of the hollow body. It is advantageous that two of the bearings are arranged on either side of the annular disk whereby the two bearings each comprise an outer bearing ring, and wherein the pressure sleeve further comprises a shoulder. The outer bearing ring of a first one of the two bearings rests at the second follower, and the outer bearing ring of a second one of the two bearings rest at the shoulder of the pressure sleeves.

The bearings are preferably axial bearings, especially in the form of needle bearings or ball bearings. It is also possible to provide the bearings in the form of journal bearings.

Preferably, the pressure sleeve further comprises a guide pin and the hollow body is provided with an axial guide slot, whereby the guide pin is axially slidably connected to the guide slot of the hollow body.

In a preferred embodiment of the present invention, the hollow body comprises a shaft and an insert having an inner thread, whereby the shaft is threaded into the withdrawal sleeve and the insert is threaded into the shaft. Furthermore the spindle has an outer thread that cooperates with the inner thread of the insert. Preferably, the pressure sleeve further comprises a guide pin and the shaft has a corresponding axial guide slot, with the guide pin being axially slidably connected to the guide slot of the shaft. Furthermore, the shaft has preferably an outer thread and the adjusting sleeve has an inner thread, whereby the adjusting sleeve with its inner thread is threaded onto the outer thread of the shaft.

Advantageously, the adjusting sleeve has an outer mantle surface with at least one opening for receiving an adjusting tool. Furthermore, the pressure sleeve has preferably an outer mantle surface with at least one opening for receiving an auxiliary tool.

DESCRIPTION OF PREFERRED EMBODIMENT

The present invention will now be described in detail with the aid of a specific embodiment utilizing the only Figure.

The withdrawal device is comprised of a hollow body 1 which is penetrated by a threaded spindle 2. The hollow body 1 is comprised of a withdrawal sleeve 3, a shaft 4 which is threaded into the sleeve 3, and a threaded insert 5 which is threaded into the shaft 4. The threaded insert 5 is provided with an inner thread 6 cooperating with the outer thread 7 of the spindle 2. The two-part hollow body 1 comprising the withdrawal sleeve 3 and the shaft 4 allows the use of different withdrawal sleeves while the other part of the withdrawing device can still be used. This type of embodiment has been described in the aforementioned German Auslegeschrift 1 269 069. Furthermore, if necessary, the withdrawing device may be extended by inserting a further shaft corresponding to the shaft 4, since the insert 5 may be removed and a respective spindle 2 of a greater length may be used.

The withdrawal sleeve S is provided with slots 8 that are extending into the vicinity of the threaded end of the sleeve 3. The slots 8 define between them tongues 9 which have elastic properties in a radial direction relative to the longitudinal axis A of the withdrawing device. These elastic tongues 9 are provided with outwardly conically widening ends 10 which form a conical outer mantle surface 11 of the withdrawal sleeve 3. The conical ends 10 constitute with their free ends withdrawal elements 12 which, in the embodiment shown, are formed as gripping elements, however, they may also be in the form of jaws, as described in German Auslegeschrift 1 269 069. The gripping elements 12 engage the rollers of a conical roller bearing to be removed and thus hold this bearing, whereby the spindle 2 with its inner end rests at the face of the arbor on which the bearing is positioned. Upon placing the withdrawing device onto the bearing, the gripping elements engage past its rollers the inner ring of the roller bearing. For this purpose, the tongues 9 must be radially inwardly adjusted. In order to accomplish this, a clamping sleeve 13 is provided which is comprised essentially of a pressure sleeve 14 and an adjusting sleeve 15. The pressure sleeve 14 is provided with an inner cone 16 with an inner conical surface 17 which has the same conical angle as the corresponding conical outer mantle surface 11, thus abutting without play at the outer mantle surface 11. The pressure sleeve 14 is axially displaced by the adjusting sleeve 15. For this purpose, the adjusting sleeve 15 with its inner thread 18 is rotatable on the outer thread 19 of the shaft 4 and is thus axially displaceable. For transmitting the axial adjusting movement onto the pressure sleeve 14, a follower 20 in the form of an annular disk is provided which is connected to the adjusting sleeve 15 in a pressure-fitting manner and is resting at a shoulder 21 of this adjusting sleeve 15, thereby being rotatable together with the adjusting sleeve 15. On either side of the annular disk 20 an axial needle bearing 22, respectively, 23 is arranged. The outer bearing ring 24 of the needle bearing 22 rests at a shoulder 25 of the pressure sleeve 14. The outer bearing ring 26 of the bearing 23 rests at a spring ring 27 which is inserted into the pressure sleeve 14, this spring ring 27 forming a fixed follower which is not in contact with the adjusting sleeve 15. A further follower 28 which is also embodied in the form of a spring ring is inserted into the adjusting sleeve 15 in the vicinity of its one end. Between the spring ring 28 and the annular disk 20, a cup ring 29 is provided which serves as a sealing to prevent the introduction of dust particles into the bearings 22, 23. The cup ring 29 defines a slot of a minute width together with the outer bearing ring 24 of the bearing 22 and with the mantle surface of the pressure sleeve 14, so that it does not come into contact with these parts.

In the area of the bearings 22, 23, a guide pin 30 is inserted into the pressure sleeve 14 which is guided in a slidable manner within an axial glide slot 31 of the shaft 4. Between the annular disc 20 and the mantle surface of the pressure sleeve 14, respectively, the face of the guide pin 30, an annular slot of a small width is present so that no surface contact takes place.

When rotating the adjusting sleeve 15 within the threaded portion 18, 19, the two followers 20 and 28 as well as the cup ring 29 which is clamped between them are rotated. This rotational movement is transmitted to the bearings 22 and 23 whereby the roller bodies of these bearings roll on the fixed outer bearing rings 24 and 26. The simultaneously occurring axial pushing force for closing the withdrawal sleeve (to the left in the drawing) is transmitted via the follower 20 and the outer bearing ring 24 onto the shoulder 25 of the pressure sleeve 14 which during this axial movement is axially guided via the guide pin/guide slot arrangement 30, 31. In the opposite direction, i e., for opening the withdrawal sleeve, the axial pushing force is transmitted via the follower 28, the cup ring 29, the follower 20, the outer ring 26 and the follower 27 onto the pressure sleeve 14 which is axially guided in the same manner by the guide pin/guide slot arrangement 30, 31.

The adjusting sleeve 15 may be turned manually which may be facilitated by an outer knurling 32A. In the case that an especially great activating force must be provided, for example, because of the size of the bearing to be removed, two openings 32 and 33 are provided at the outer mantle surface of the adjusting sleeve 15 into which an adjusting tool, for example, a fork wrench, may be inserted The threaded insert 5 may also be provided with two openings 34 and 35 for the insertion of such an auxiliary tool. The pressure sleeve 14 is also provided with two openings 36 and 37 in order to assist the withdrawal movement with an auxiliary tool if necessary.

The present invention is, of course, in no way restricted to the specific disclosure of the specification and drawings, but also encompasses any modifications within the scope of the appended claims.

What we claim is:

1. A withdrawing device for withdrawing a roller bearing from an arbor, said withdrawing device comprising:

a hollow body comprising a withdrawal sleeve;

a spindle axially penetrating said hollow body;

said withdrawal sleeve having axially extending slots defining therebetween tongues having free ends that radially outwardly widen in a cone shape with a conical outer mantle surface, said free ends constituting withdrawal elements;

a clamping sleeve axially slidably and rotatably connected to said hollow body, said clamping sleeve having at one end thereof a conical inner mantle surface mating with said conical outer mantle surface of said free ends;

said clamping sleeve being comprised of a pressure sleeve and an adjusting sleeve, with said pressure sleeve comprising said conical inner mantle surface and with said adjusting sleeve being rotatably connected to said hollow body and rotatably and axially fixedly connected to said pressure sleeve; and at least two followers for connecting said pressure sleeve and said adjusting sleeve to one another, and bearings for supporting said followers relative to one another.

2. A withdrawal device according to claim 1, wherein a first said follower is axially and rotatably fixedly connected to said adjusting sleeve, and a second said follower is axially and rotatably fixedly connected to said pressure sleeve.

3. A withdrawal device according to claim 2, wherein said first follower is an annular disk coaxially arranged relative to a longitudinal axis of said hollow body.

4. A withdrawal device according to claim 3, wherein two of said bearings are arranged on either side of said annular disk, said two bearings each comprising an outer bearing ring, and wherein said pressure sleeve further comprises a shoulder, with said outer bearing ring of a first one of said two bearings resting at said second follower and with said outer bearing ring of a second one of said two bearings resting at said shoulder of said pressure sleeve.

5. A withdrawal device according to claim 1, wherein said bearings are axial bearings.

6. A withdrawal device according to claim 5, wherein said axial bearings are needle bearings.

7. A withdrawal device according to claim 5, wherein said axial bearings are ball bearings.

8. A withdrawal device according to claim 1, wherein said bearings are journal bearings.

9. A withdrawal device according to claim 1, wherein said pressure sleeve further comprises a guide pin and wherein said hollow body has an axial guide slot, with said guide pin being axially slidably connected to said guide slot of said hollow body.

10. A withdrawal device according to claim 1, wherein said hollow body further comprises a shaft and an insert having an inner thread, said shaft being threaded into said withdrawal sleeve, and said insert being threaded into said shaft, and wherein said spindle has an outer thread cooperating with said inner thread of said insert.

11. A withdrawal device according to claim 10, wherein said pressure sleeve further comprises a guide pin and wherein said shaft has an axial guide slot, with said guide pin being axially slidably connected to said guide slot of said shaft.

12. A withdrawing device according to claim 10, wherein said shaft has an outer thread, and wherein said adjusting sleeve has in inner thread, with said adjusting sleeve being threaded with said inner thread onto said outer thread of said shaft.

13. A withdrawal device according to claim 1, wherein said adjusting sleeve has an outer mantle surface having at least one opening for receiving an adjusting tool.

14. A withdrawal device according to claim 1, wherein said pressure sleeve has an outer mantle surface having at least one opening for receiving an auxiliary tool.

* * * * *